![US007159033B2]()

United States Patent
Etoh

(10) Patent No.: US 7,159,033 B2
(45) Date of Patent: Jan. 2, 2007

(54) ROUTER SEARCH SYSTEM, ROUTER SEARCH METHOD AND ROUTER SEARCH PROGRAM

(75) Inventor: Hiroaki Etoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 10/127,135

(22) Filed: Apr. 12, 2002

(65) Prior Publication Data

US 2002/0161920 A1    Oct. 31, 2002

(30) Foreign Application Priority Data

Apr. 19, 2001 (JP) .............................. 2001-121695

(51) Int. Cl.
*G06F 15/173* (2006.01)
(52) U.S. Cl. ...................................... 709/238; 709/249
(58) Field of Classification Search ................ 709/238; 714/701
See application file for complete search history.

(56) References Cited

U.S. PATENT DOCUMENTS

| | | | | |
|---|---|---|---|---|
| 5,668,800 A | * | 9/1997 | Stevenson ................... 370/248 |
| 5,798,706 A | * | 8/1998 | Kraemer et al. ............... 726/3 |
| 5,835,720 A | * | 11/1998 | Nelson et al. ............... 709/224 |
| 5,968,126 A | * | 10/1999 | Ekstrom et al. ............ 709/225 |
| 6,047,330 A | * | 4/2000 | Stracke, Jr. ................. 709/238 |
| 6,192,051 B1 | * | 2/2001 | Lipman et al. .............. 370/389 |
| 6,515,967 B1 | * | 2/2003 | Wei et al. ..................... 370/244 |
| 6,560,644 B1 | * | 5/2003 | Lautmann et al. .......... 709/223 |
| 6,680,942 B1 | * | 1/2004 | Mead et al. ................. 370/392 |
| 6,779,035 B1 | * | 8/2004 | Gbadegesin ................ 709/228 |
| 6,862,699 B1 | * | 3/2005 | Nakashima et al. ......... 714/701 |
| 7,054,319 B1 | * | 5/2006 | Akahane et al. ........ 370/395.53 |
| 2002/0143905 A1 | * | 10/2002 | Govindarajan et al. ..... 709/220 |

OTHER PUBLICATIONS

Postel, J.; "Internet Control Message Protocol"; Sep. 1981; RFC 792.*
"Sams Teach Yourself TCP/IP in 24 Hours" Second Edition; Hour 6.*

* cited by examiner

*Primary Examiner*—William Vaughn
*Assistant Examiner*—Greg Bengzon
(74) *Attorney, Agent, or Firm*—Douglas W. Cameron; Anne Vachon Dougherty

(57) ABSTRACT

A transmitter router search apparatus 26 transmits an inspection IP packet to an inspection target network connection apparatus via an intranet 10. The source and destination IP addresses of the inspection IP packet are designated respectively as the IP addresses of a recipient router search apparatus 28 and the inspection target network connection apparatus. A TCP packet, including predetermined ID information, is included in the data portion. The inspection target network connection apparatus generates an IP packet corresponding to the received inspection IP packet. Since the transmission source and destination of the response IP packet are respectively designated the transmission destination and source of the inspection IP packet, the recipient router search apparatus 28 receives the response IP packet via the Internet 19, so long as the inspection target network connection apparatus is a router.

14 Claims, 7 Drawing Sheets

ROUTER SEARCH SYSTEM, ROUTER SEARCH METHOD AND ROUTER SEARCH PROGRAM

TECHNICAL FIELD

The present invention relates to a router search system and a router search method for searching a network connection apparatus that serves as a router, and in particular to a router search system, a router search method and a router search program for searching an intranet, for example, for an unauthorized router.

DESCRIPTION OF RELATED ART

While operating a user terminal, such as a notebook computer, connected to a large-scale intranet, a user may access an external ISP (Internet Service Provider) via his or her handy terminal modem or ISDN router to read mail. Now, while official routers for intranets are normally equipped with satisfactory firewalls, temporary routers, such as are used for the preceding purpose, have weak firewalls, and tend to be targeted by individuals seeking to effect unauthorized accesses. It should also be noted that OSs such as Windows NT and Windows 2000 (trademarks of Microsoft Corp.), for example, are equipped with router functions, and that once these router functions have specifically been set for automatic operation, they are automatically initiated when users access external ISPs, via their modems, regardless of whether it is the users' intention that these functions be activated.

The following four methods are conventionally well known procedures employed for the detection of a router.

(a) Banner Grabbing

In this case, the maker of an apparatus and an OS are identified by reading a message at the time a connection is made with a telnet or an ftp session. When a router is constituted by a special network apparatus, this method may be used to detect the router method.

(b) OS Detection

The response to a packet that normally not appears depends on the mounting of a network for each apparatus. Therefore, the identity of an OS can be extracted from the response. This method can also be used to detect a special router.

(c) Routing Protocol

Several protocols (RIP, OSPF, etc) are provided for use by a router so that routing information may be exchanged with nearby routers. Thus, when the transmission of a response governed by one of these protocols is detected it means that the router function is active.

(d) SNMP Method (Simple Network Management Protocol)

The remote management protocol for network apparatuses, SNMP, is provided for many routers. And while accesses are controlled under SNMP, once an unauthorized individual has gained access, through the use of SNMP all necessary data concerning router functions and operating information for router interfaces can be obtained.

[Problems to be Solved by the Invention]

By employing these conventional detection methods, a router can be identified; however, whether the router is connected to the Internet can not be determined. Further, when an OS, such as Linux or Windows, is used as a router, the status of the routing service can not be extracted even though the OS is identified. Depending on the OS detection method, information located beyond the router and the function of the computer as a router can not be identified. Also, reference the routing protocol method, it is difficult to detect routers using a network apparatus or a low priced OS, because in many cases routing protocols are not supplied with these routers. Further, the SNMP method is inappropriate because access control can not be used to obtain information, and because there are routers for which SNMP is not supplied.

SUMMARY OF THE INVENTION

It is one object of the present invention to search for an unauthorized router present on an intranet.

It is another object of the present invention to provide a router search system, a router search method and a router search program to be used for accurately searching for a network connection apparatus that is currently being operated as a router for connecting multiple networks.

According to a first aspect of the invention, a router search system examines network connection apparatuses connected to a first network to search for a network connection apparatus that is connected to a second network outside the first network. The router search system comprises a transmitter router search apparatus and a recipient router search apparatus that are respectively connected to the first and the second networks. The transmitter router search apparatus includes: generating means, for generating an IP packet (hereinafter referred to as an inspection IP packet) including information (hereinafter referred to as search packet information) indicating that a destination IP address and a source IP address are defined as IP addresses for a target network connection apparatus to be inspected and the recipient router search apparatus, and that the inspection IP packet is for a router search; and inspection IP packet transmission means, for transmitting the inspection IP packet. The recipient router search apparatus includes: reception means, for receiving an IP packet addressed to the recipient; and determination means, for determining whether the IP packet received by the reception means is an IP packet (hereinafter referred to as a response IP packet) that constitutes a response to the inspection IP packet transmitted by the target network connection apparatus to be inspected, and for, based on the determination results, determining whether the target network connection apparatus is currently operating as a router.

Of the network apparatuses connected to the first network, a network apparatus that was not selected during the preceding inspection, or such a network apparatus for which little time has elapsed since it received an IP address, may be selected as a current inspection target. When the first network is an intranet, all the network apparatuses registered in the address space of that intranet, i.e., all the network apparatuses currently connected to the intranet, may be designated as inspection targets. In this case, the inspection time is not especially extended.

Upon receipt of an IP packet (hereinafter referred to, as needed, as an inspection IP packet), the network connection apparatus transmits an IP packet of a predetermined response (hereinafter referred to, as needed, as a response IP packet). The destination IP address and the source IP address of the response IP packet are the source IP address and the destination IP address of the inspection IP packet. When the inspection target network connection apparatus is a currently operating router, the response IP packet is transmitted by the currently operating router across the second network to the recipient router search apparatus. The determination means of the recipient router search apparatus determines whether the IP packet received by the reception means includes search packet information. If the search packet information is included, it is ascertained that the inspection target network connection apparatus is a currently operating router. If the inspection target network connection apparatus is not a currently operating router, the response IP packet is generally terminated in the first network, and is not transmitted to the second network.

According to a second aspect of the invention, in the router search system of the first aspect, the search packet information is written in the packet header on a transport layer on which IP packets are accumulated and that conforms to an OSI Reference Standard Model.

An OSI Reference Standard Model packet is, for example, a TCP packet or a UDP packet. At a predetermined position in the header of the transport layer of a response IP packet generated by the router, the data in a predetermined portion of the header of the transport layer of the inspection IP packet is stored unchanged, or its correlated value is stored (e.g., for the sequential number of a TCP packet, the sequential number of a response TCP packet is obtained by incrementing by one the sequential number of an inspection TCP packet). Therefore, the search packet information originating at the transmitter router search apparatus is transmitted through the currently operating router to the recipient router search apparatus. The recipient router search apparatus can employ the search packet information contained in the IP packet to determine whether the contents of the IP packet are derived from the inspection IP packet.

According to a third aspect of the invention, the transmitter router search apparatus in the router search system of the first or second aspect further comprises: acquisition means for permitting, or enabling, the recipient router search apparatus to obtain current search packet information before transmitting an inspection IP packet received from the inspection IP packet transmission means.

The acquisition means includes not only notification means for notifying a recipient router search apparatus of current search packet information according to the HTTP or FTP protocol, but also an information providing means for presenting the current search packet, for example, to a predetermined web page. When the acquisition means serves as is information providing means, the recipient router search apparatus obtains push type search packet information.

According to a fourth aspect, in the router search system of the first to third aspect, the first network and the second network are an intranet and the Internet.

In order to determine whether the inspection target network connection apparatus is a currently operating router, the IP address of this apparatus must be obtained. That is specifically, an examination is performed not only for all the network connection apparatuses connected to a network, but also, an examination is performed for network connection apparatuses that are selected as currently operating router choices. When the transmitter router search apparatus and the inspection target network connection apparatus are connected to an intranet, the network connection apparatuses can be smoothly selected as router choices that are currently being operated, and the IP addresses of these apparatuses can be comparatively uniformly detected. Thus, the router detection process can be performed efficiently.

According to a fifth aspect, in the router search system of the fourth aspect, the transmitter router search apparatus is arranged for multiple intranets, and the recipient router search apparatus is arranged in common with multiple transmitter router search apparatuses. The search packet information in the inspection IP packet, which is generated by the generation means of the transmitter router search apparatus for each intranet, can be individually identified for each intranet.

The recipient router search apparatus is used in common by multiple intranets to which the inspection target network connection apparatus is connected, so that the configuration of the entire router search system is simplified.

According to a sixth aspect, in the router search system of the second aspect, a transport layer packet is a TCP packet, and the search packet information is written in a source port number, a destination port number and/or a sequential number portion of the TCP packet.

According to a seventh aspect, in the router search system of the second aspect, a transport layer packet is a UDP packet, and the search packet information is written in a source port number and/or a destination port number portion of the UDP packet.

According to an eighth aspect of the invention, by a router search method, network connection apparatuses connected to a first network are examined to search for a network connection apparatus that is connected to a second network outside the first network. The router search method comprises a transmitter router search method and a recipient router search method that are respectively executed on the first and the second networks. The transmitter router search method includes: a generating step of generating an IP packet (hereinafter referred to as an inspection IP packet) including information (hereinafter referred to as search packet information) indicating that a destination IP address and a source IP address are defined as IP addresses for a target network connection apparatus to be inspected and the recipient router search method, and that the inspection IP packet is for a router search; and an inspection IP packet transmission step of transmitting the inspection IP packet. The recipient router search method includes: a reception step of receiving an IP packet addressed to the recipient; and a determination step of determining whether the IP packet received at the reception step is an IP packet (hereinafter referred to as a response IP packet) that constitutes a response to the inspection IP packet transmitted by the target network connection apparatus to be inspected, and of, based on the determination results, determining whether the target network connection apparatus is currently operating as a router.

For example, the search packet information is written in the packet header on a transport layer on which IP packets are accumulated and that conforms to an OSI Reference Standard Model. Preferably, the transmitter router search method further comprises: an acquisition step of permitting, or enabling, the recipient router search method to obtain current search packet information before transmitting an inspection IP packet received at the inspection IP packet transmission step. For example, the first network and the second network are an intranet and the Internet. For example, the transmitter router search method is executed for multiple intranets, and the recipient router search method is executed in common with multiple transmitter router search methods. The search packet information in the inspection IP packet, which is generated at the generation step of the transmitter router search method for each intranet, can be individually identified for each intranet.

According to the router search method of the invention, a transport layer packet is a TCP packet, and the search packet information is written in a source port number, a destination port number and/or a sequential number portion of the TCP packet. In another aspect of the invention, a transport layer packet is a UDP packet, and the search packet information is written in a source port number and/or a destination port number portion of the UDP packet.

According to the present invention, a transmitter router search program permits a computer to perform the individual steps of the router search method and the transmitter router search method of the invention.

Furthermore, according to the present invention, a recipient router search program permits a computer to perform the individual steps of the router search method and the recipient router search method.

Figure 1:
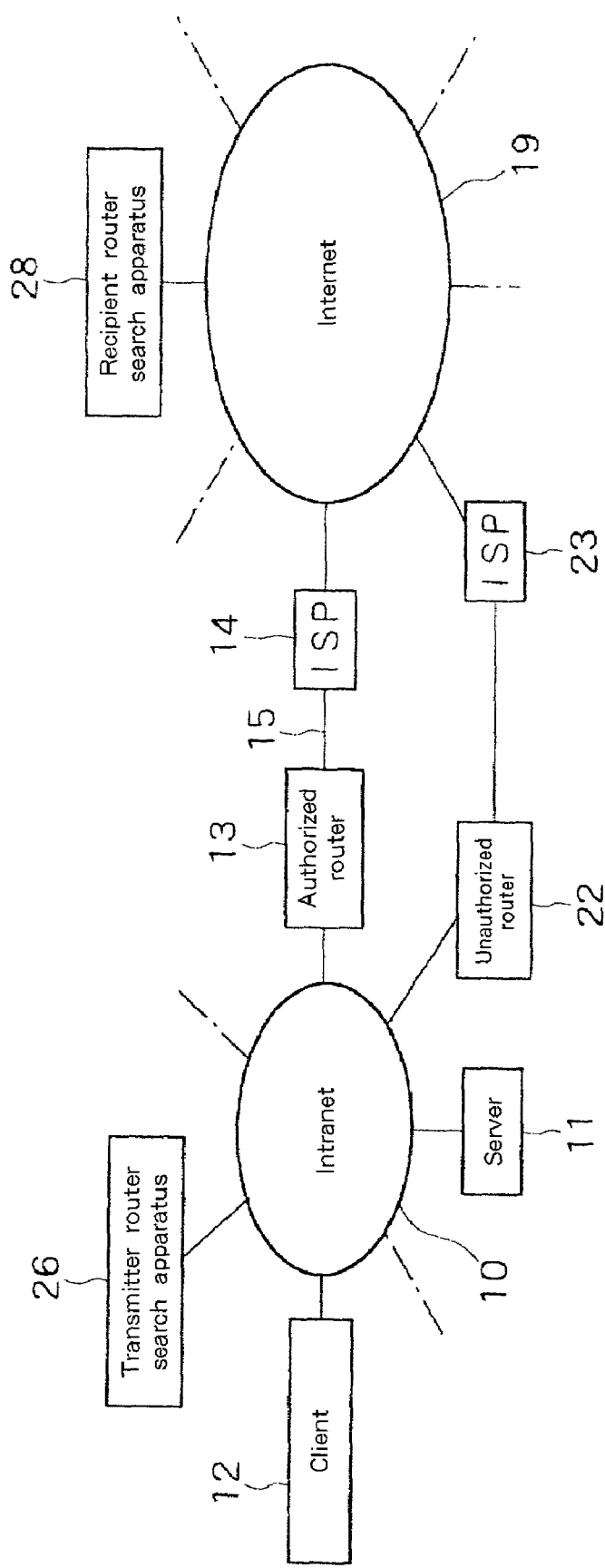
FIG. 1 is a diagram showing the locations of the apparatuses in a router search system relative to an intranet and the Internet.

[Description of the Symbols]
10: Intranet
19: Internet
22: Unauthorized router
26: Transmitter router search apparatus
28: Recipient router search apparatus
36: SID setting means
37: SID notification means
41: List preparation means
42: TCP packet generation means
43: IP packet generation means
44: IP packet transmission means
49: SID reception means
50: SID registration means
53: IP packet reception means
54: SID extraction means
55: SID comparison means
56: Router determination means

DETAILED DESCRIPTION OF THE INVENTION

The preferred embodiment of the present invention will now be described while referring to the accompanying drawings. FIG. 1 is a diagram showing the locations of the individual apparatuses of a router search system relative to an intranet 10 and the Internet 19. Connected to the intranet 10, which is set up for an entire company and includes a branch company and a local office, are a predetermined number of servers 11 and multiple clients 12. A router 13 is an authorized router that connects the intranet 10 to the Internet 19, either via a private line 15 and an ISP 14 or directly. A router 22 is an unauthorized router for the intranet 10, and some of the clients 12 may also become unauthorized routers 22, even though their users have no malicious intent. For example, while an employee of the company served by the intranet 10 normally connects his or her notebook computer to one of the clients 12, the same employee may also exchange private mail by connecting a built-in, handy modem terminal to a provider with whom he or she has concluded a contract. In this case, a terminal so connected to the Internet 19, via an ISP 23, becomes an unauthorized router 22. Especially when an OS includes a router function, a personal computer can serve as an unauthorized router 22, the firewall of which is considerably weaker than that of an authorized router 13, and may tend to present a target for crackers who desire to break into an intranet 10. Therefore, an administrator or an operations management trustee of such an intranet 10 must quickly detect an unauthorized router 22, and transmit to the user of that unauthorized router 22 a notification to immediately halt the use of that function.

Figure 2:
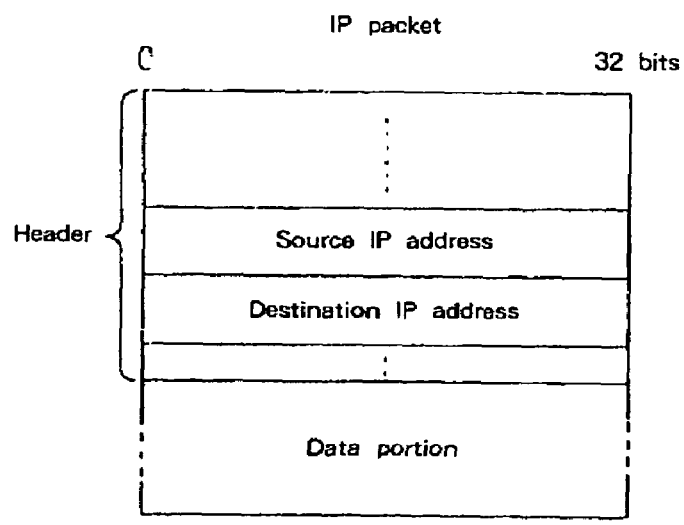
FIG. 2 is a schematic diagram showing the structure of an IP packet.

FIG. 2 is a schematic diagram showing the structure of an IP packet, which is well known. The IP packet, a packet for a network layer of the OSI Reference Model standard, includes a header, in which are a source IP address and a destination IP address of 32 bits each, and a succeeding data portion.

Figure 3:
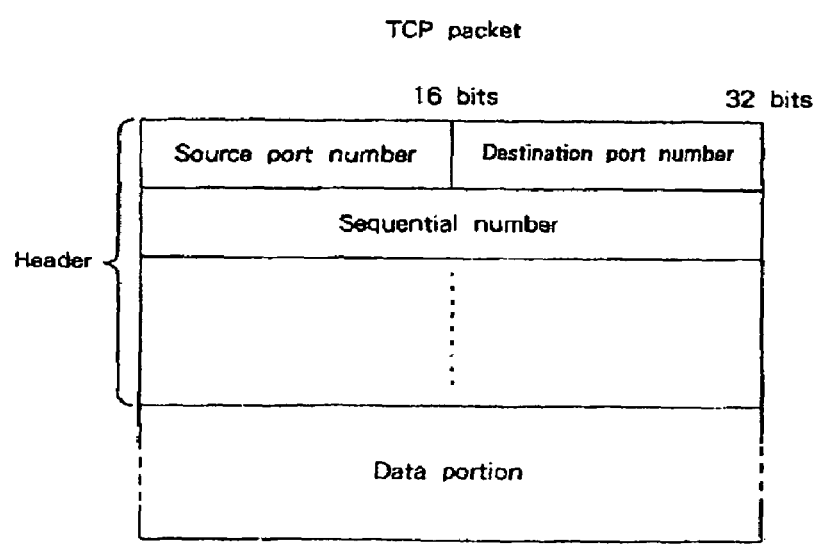
FIG. 3 is a schematic diagram showing the structure of a TCP packet.

FIG. 3 is a schematic diagram showing the structure of a TCP packet as a transport layer packet of the OSI Reference Model standard is well known. The TCP packet includes a header and a succeeding data portion, and in the header is a portion describing a source port number (16 bits), a destination port number (16 bits), a sequential number (32 bits), . . . in the named order.

Figure 4:
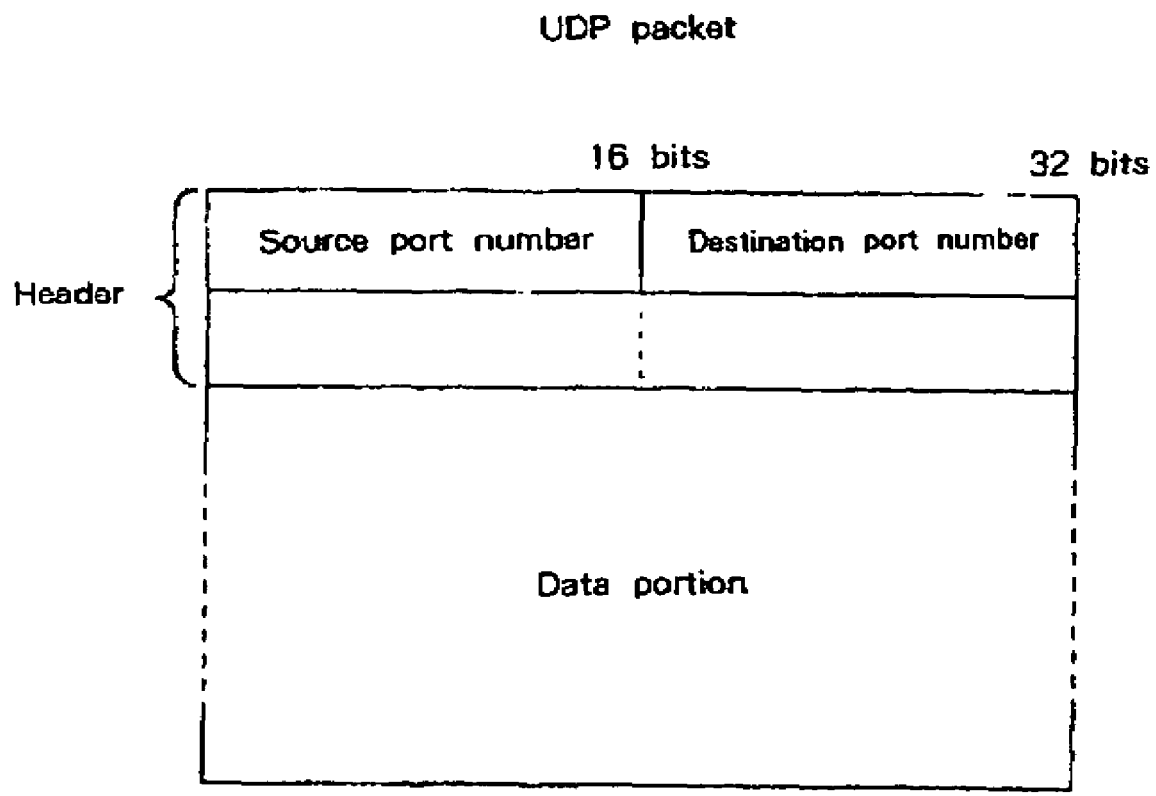
FIG. 4 is a schematic diagram showing the structure of UDP packet.

FIG. 4 is a schematic diagram showing the structure of a UDP packet as a transport layer packet of the OSI Reference Model standard is well known. The UDP packet includes a header and a succeeding data portion, and in the header is a portion describing a source port number (16 bits), a destination port number (16 bits), . . . in the named order.

As an example in line with the technical idea of the invention, a transmitter router search apparatus 26 transmits, to a network connection apparatus (hereinafter referred to, as needed, as an "inspection target network connection apparatus") that appears to be being operated as an unauthorized router 22, an IP packet (hereinafter referred to, as needed, as an inspection IP packet) that designates the inspection target network connection apparatus and a recipient router search apparatus 28. Then, whether the network connection apparatus is a currently operating router is determined, depending on whether the recipient router search apparatus 28 receives a response IP packet. An explanation will now be given for the results of an experiment run as to examine whether this technical idea can be actually established.

In the experiment, the network connection apparatuses to be inspected were a router and an IP masquerade router provided for Linux. The same results were obtained for both routers. The experiment was conducted while the routers had the 9.116.*.* (the address is hidden because of security) interface for eth0 (eth is the abbreviation for ethernet) and the 192.168.3.1 interface for eth1. That is, eth0 and eth1 are interfaces for a router for an intranet and for the Internet. Packet logs A and B below are two responses to an TCP SYN packet that designated 9.116.*.* as a destination IP address and a forged source IP address as 192.168.3.11. These packet logs were actually output by eth0 to eth1 by the routers that were used in the experiment. Since the forged packet was received by eth0, it was not output to the packet log for eth1. The points that should be noted are the following, (a) to (d):
(a) The source IP address of a response packet is the intranet address of the inspection target network connection apparatus (i.e., this is eth0 and is not the Internet address eth1).
(b) The routers also transmitted reset packets as responses to the packet transmitted to the closed port (telnet). That is, a port that is opened for the search need not be assumed.
(c) When the sequence number (12345) is set and transmitted, a value of (12345+1) is returned to the response packet. That is, since the information used for a search is transmitted to the reception side apparatus, the TCP sequence number can be employed.
(d) The packet log can be used as an area for transmitting port numbers (the port numbers of a source and a destination) to the recipient router search apparatus 28.

[Packet Log A]
tcpdump: listening on eth1
11:37:16.496399>arp who-has 192.168.3.11 tell sx.trl.ibm.com (0:10:5a:5e:f4:7b)
11:37:16.496774<arp reply 192.168.3.11 is-at 0:4:ac:25:83:9b (0:10:5a:5e:f4:7b)
11:37:56.789002>9.116.*.*. telnet>192.168.3.11.0: R 0:0(0) ack 12346 1 win 0

[Packet Log B]
11:38:01.784129>arp who-has 192.168.3.11 tell 192.168.3.1 (0:10:5a:5e:f4:7b)
11:38:01.784473<arp reply 192.168.3.11 is-at 0:4:ac:25:83:9b (0:10:5a:5e:f4:7b)
11:39:44.991943>9.116.*.*.ssh>192.168.3.11.0: S 3171646145:3171646145(0) ack 12346 win 32696<mss 536>(CF)

Relative to packet log A, "tcpdump" is a global tool name. "192.168.3.11.0: R 0:0(0)" means that the telnet has been reset (=rejected). "ack 12346" means that the TCP packet is ack (response) and the sequence number is 12346.

Relative to packet log B, "9.116.*.*.telnet" means that the telnet has been received at the target router for the experiment. "9.116.*.*.ssh" means that ssh (encrypted telnet) has been received at the target router for the experiment. "192.168.3.11.0: S 317164145:3171646145(0)" means that ssh has been set (=accepted). "ack 12346" means that the TCP packet is ack (response) and that the sequence number is 12346.

An explanation will now be given for the transmission of a UDP packet instead of a TCP packet. As is shown in the following packet log C, an ICMP packet is transmitted as a response to the closed port (ssh). While this indicates an error, it is found that, even in this case, the value of the destination port number designated by the transmitted packet can be used for communication. In addition, the intranet address of the router can be obtained, as in the experiment conducted for the TCP.

[Packet Log C]
11:55:39.535896>9.116.*.*>192.168.3.11: icmp: 9.116.*.* udp port ssh unreachable [tos 0xc0]

ICMP, as well as TCP and UDP, is a protocol for a transport layer. When a service is requested of the router by the transmission of a UDP packet, the router that does not prepare this service transmits a response by using an ICMP packet. "ssh unreachable" means that there is no ssh.

At this time, SID is defined as an ID (identifier) that the transmitter router search apparatus 26 (FIG. 1) uses to identify an IP packet used for this inspection with another IP packet. The recipient router search apparatus 28 (FIG. 1) can determine whether the IP packet addressed to this apparatus includes the SID to determine whether the received IP packet is an inspection IP packet. Further, in FIG. 1, only one intranet 10 is shown; however, multiple intranets 10 are connected to the Internet 19, and the common intranet operation manager may employ the common recipient router search apparatus 28 to detect an unauthorized router 22 of each intranet 10 that the manager handles. In this case, the SID is set so that the inspection IP packet can be identified using an IP packet that is not an inspection IP packet, and so that the intranets 10 can mutually identify the SID. This SID includes a numerical value nt (e.g., when n1 and n2 are represented as 0101 and 1000 by the binary system, nt=01011000), which is obtained by coupling a customer number n1, determined by the intranet operation manager in consonance with each intranet 10, and a numerical value n2, which corresponds to the date or the time whereat the inspection IP packet was transmitted by the transmitter router search apparatus 26.

Figure 5:
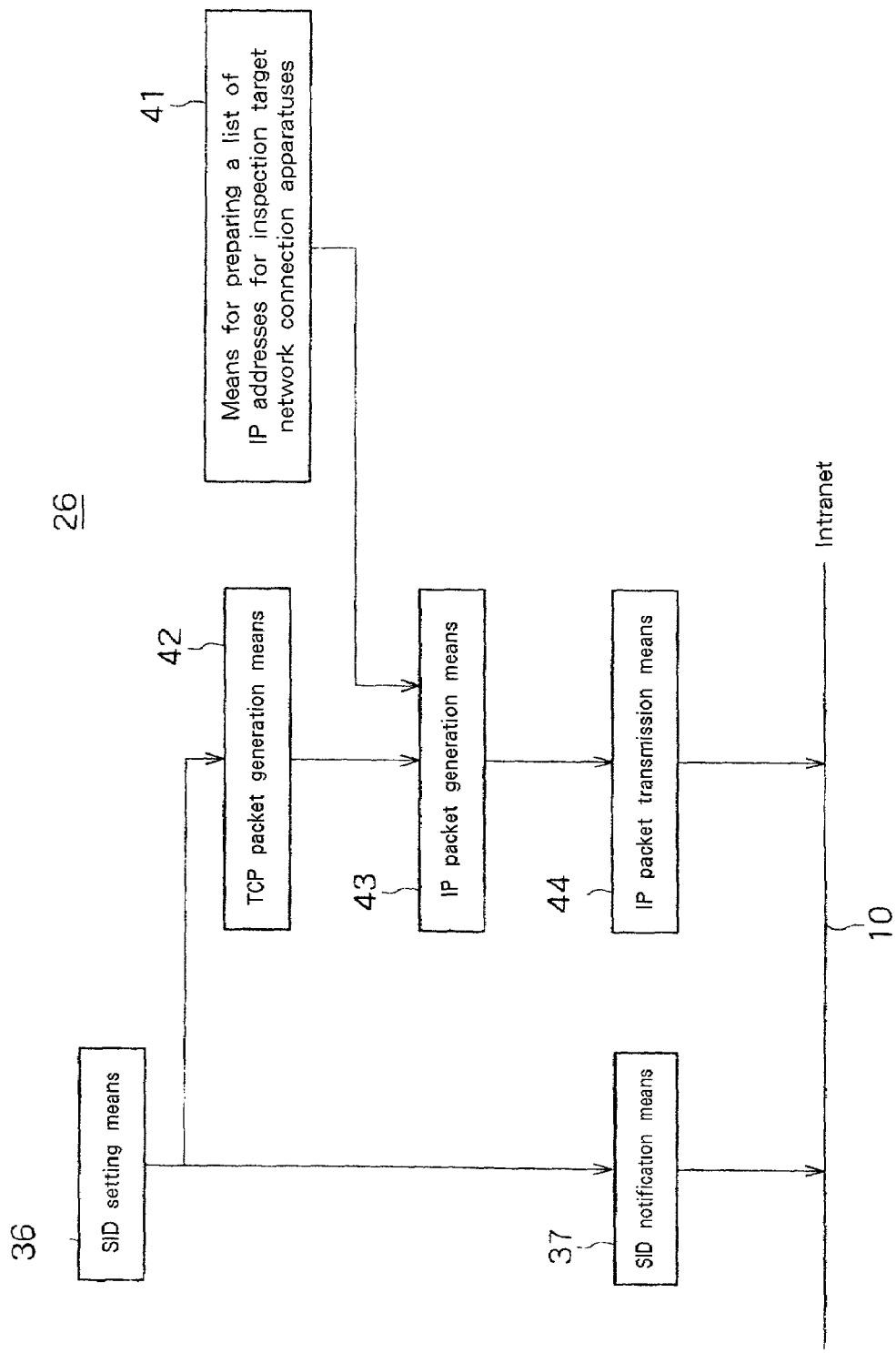
FIG. 5 is a block diagram showing the function of a transmitter router search apparatus.

FIG. 5 is a block diagram showing the functions of the transmitter router search apparatus 26. SID setting means 36 sets an SID that is to be included as search packet information in an inspection IP packet that the recipient router search apparatus 28 transmits for the current inspection. According to HTTP or FTP, SID notification means 37 transmits notification of the SID set by the SID setting means 36 to the recipient router search apparatus 28. This notification is then transmitted by the intranet 10 to the Internet 19 via the authorized router 13. List preparation means 41 prepares a list of the IP addresses of all the inspection target network connection apparatuses on the intranet 10, and TCP packet generation means 42 generates a TCP packet that includes a header based on the SID set by the SID setting means 36. Specifically, the SID is written in the source port number, the destination port number and/or the sequence number in FIG. 3, so that an SID having a maximum of 64 bits can be written in the header of the TCP packet. IP packet generation means 43 generates a predetermined IP packet, and in that IP packet a TCP packet generated by the TCP packet generation means 42 is mounted in the data portion, with the IP address of the recipient router search apparatus 28 designated as the source IP address while the destination IP address is the IP address of one of the inspection target network connection apparatuses that are selected in a predetermined order from the list prepared by the list preparation means 41. For all the inspection target network connection apparatuses on the list prepared by the list preparation means 41, the IP packet generation means 43 generates an IP packet that designates the IP addressees of these network connection apparatuses as destination IP addresses. It should be noted that the source IP address of the IP packet generated by the IP packet generation means 43 is not actually the IP address of the transmitter router search apparatus 26, but is instead the IP address of the reception router search apparatus 28. Finally, IP packet transmission means 44 sequentially outputs, to the intranet 10, IP packets generated by the IP packet generation means 43.

The transmitter router search apparatus 26 transmits the IF packets (inspection IF packets), transmitted by the IP packet transmission means 44 to the intranet 10, to the inspection target network connection apparatuses that match the destination IP addresses. Each inspection target network connection apparatus, in response to the reception of an inspection IP packet, generates an IP packet (response IP packet) that includes a source IP address and a destination IP address that match the destination IP address and the source IP address contained in the inspection IP packet, i.e., that are the IP addresses of the inspection target network connection apparatus and of the recipient router search apparatus 28. If the inspection target network connection apparatus is a router, the response IP packet is transmitted by that router across the Internet 19 to the recipient router search apparatus 28. Whereas if the inspection target network connection apparatus is not a router, the response IP packet is transmitted to the intranet 10 where the authorized router 13 inhibits the transmission of the response IP packet from the intranet 10 to the Internet 19, terminating the response IP packet at the intranet 10. Therefore, when the reception router search apparatus 28 receives a response IP packet, it can be assumed that the inspection target network connection apparatus is a currently operating router.

Figure 6:
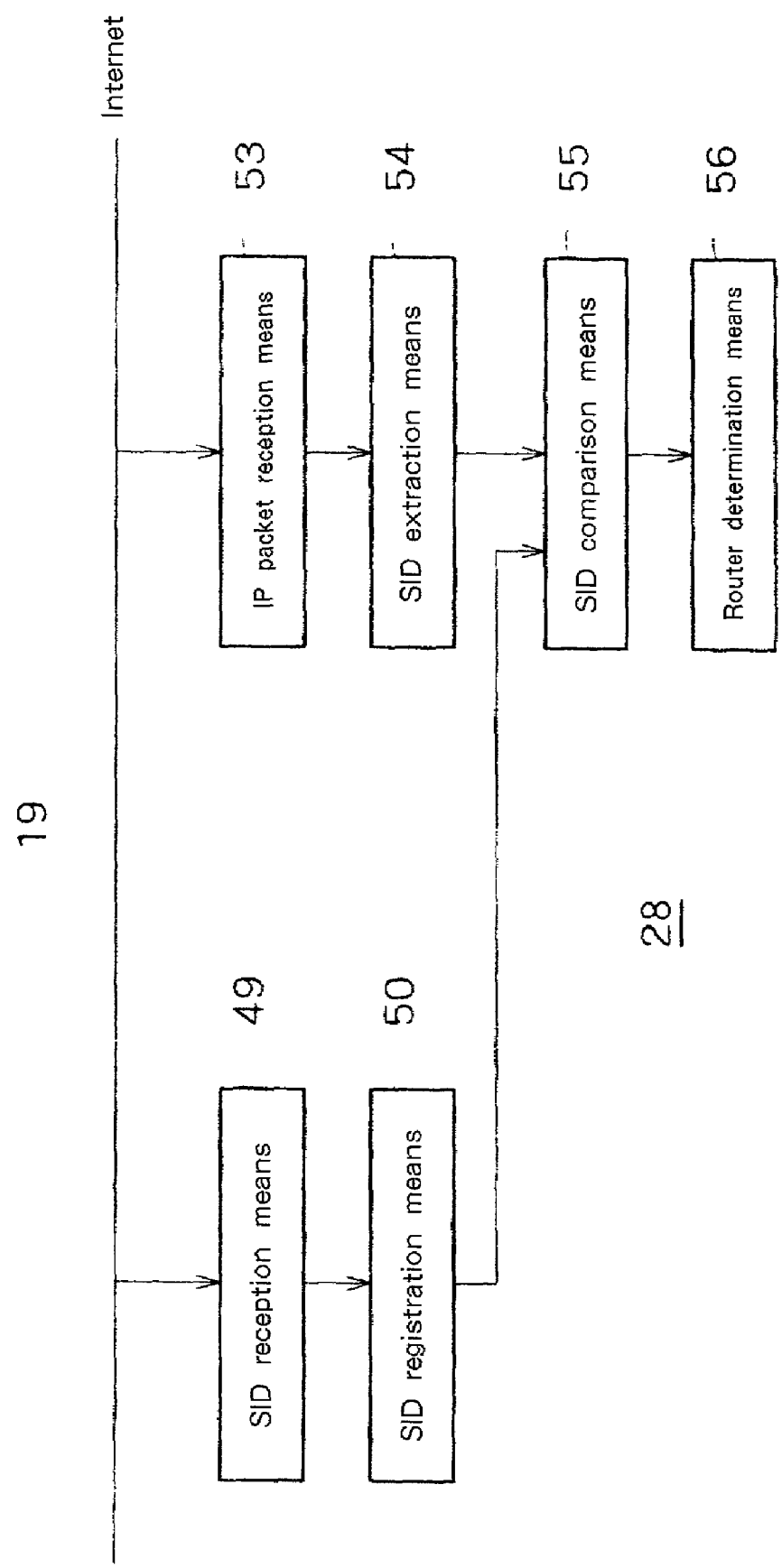
FIG. 6 is a block diagram showing the function of a recipient router search apparatus.

FIG. 6 is a block diagram showing the functions of the recipient router search apparatus 28. Before the IP packet transmission means 44 of the transmitter router search apparatus 26 transmits an inspection IP packet to the intranet 10, SID reception means 49 receives SID information from the SID notification means 37 of the transmitter router search apparatus 26. SID registration means 50 registers, in a predetermined memory location, the SID information received by the SID reception means 49. The examination performed to determine whether there is an unauthorized router 22 on the intranet 10 may be performed for multiple intranets 10 while the timings are overlapped, and generally, only one recipient router search apparatus 28 is prepared and is used in common for multiple intranets 10 that are to be inspected. Therefore, for each transmitter router search apparatus 26, an SID setting means 36 designates an SID to be included in a response IP packet, which is received by the recipient router search apparatus 28, provided for the Internet 19, that is used in common for all intranets 10, so that each intranet 10 can be identified by examining an SID. IP packets addressed to IP packet reception means 53 are received through the Internet 19, and from the IP packets received by the IP packet reception means 53, SID extraction means 54 extracts TCP packets included in the data portions and extracts the SIDs from the headers of the thus obtained TCP packets. SID comparison means 55 then compares each of the SIDs extracted by the SID extraction means 54 with reference SIDs registered with the SID registration means 50, and when, as a result of the comparison performed by the SID comparison means 55, it is found that an extracted SID matches one of the reference SIDs, router determination means 56 assumes that the recipient router search apparatus 28 has received the response IP packet from the intranet 10 unauthorized router 22 that corresponds to the reference SID, and ascertains that the network connection apparatus related to the source IP address of the inspection IP packet is a currently operating router.

Figure 7:
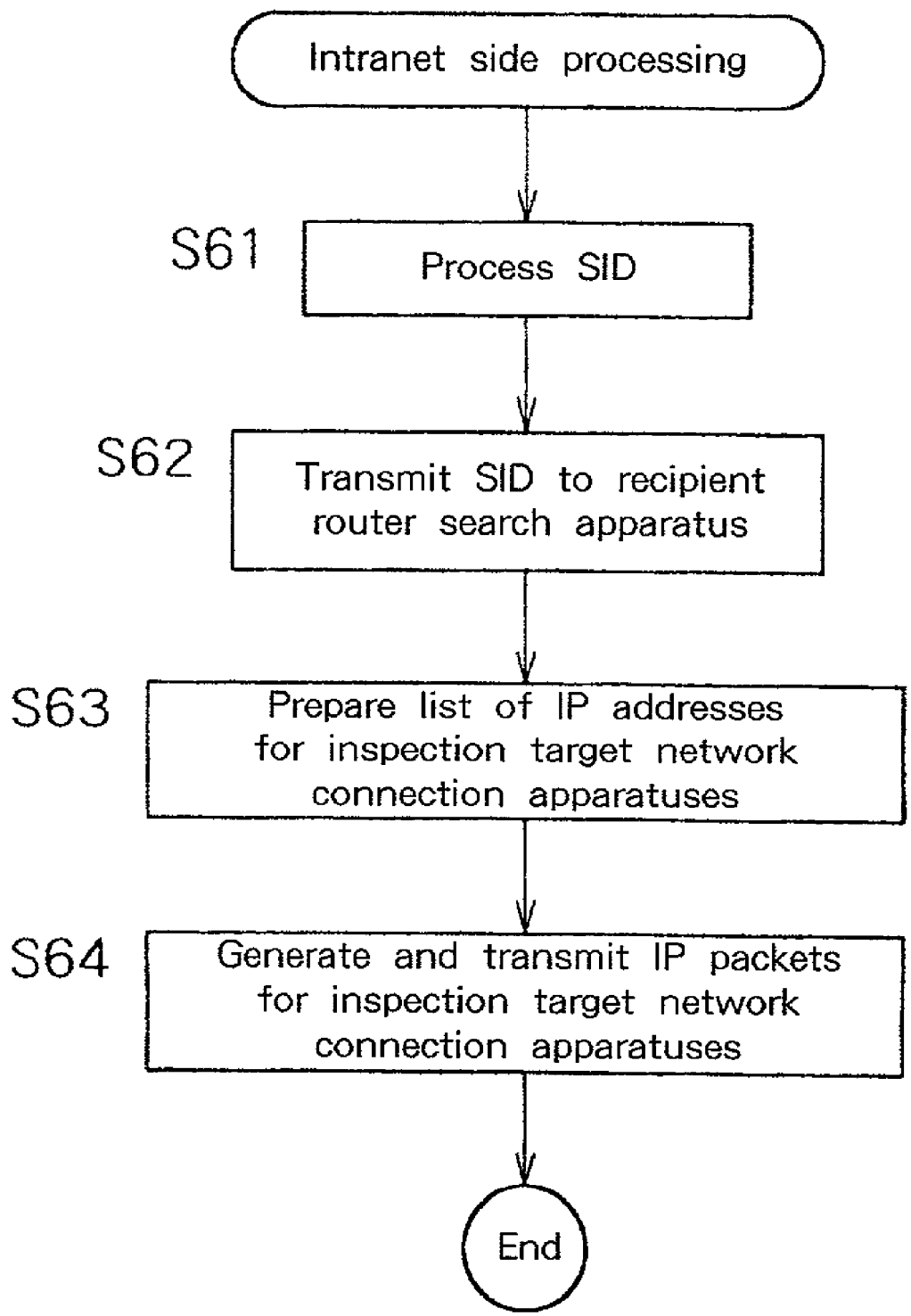
FIG. 7 is a flowchart for a program executed by the transmitter router search apparatus for router inspection.

FIG. 7 is a flowchart for a program executed by the transmitter router search apparatus 26 to inspect a router. At step S61, the transmitter router search apparatus 26 sets an SID for a current search on the intranet 10 connected to a network connection apparatus. At step S62, the SID set at step S61 is transmitted to the recipient router search apparatus 28 in accordance with the HTTP or the FTP. At step S63, the list of IP addresses is prepared for all the inspection target network connection apparatuses on the intranet 10 that have currently been examined to determine whether they are routers. At step S64, predetermined IP addresses are respectively generated for the inspection target network connection apparatuses on the list generated at step S63, and are transmitted via the intranet 10. The method for generating the IP packet at step S64 is the same as is described above for the IP packet generation means 43 in FIG. 5.

Figure 8:
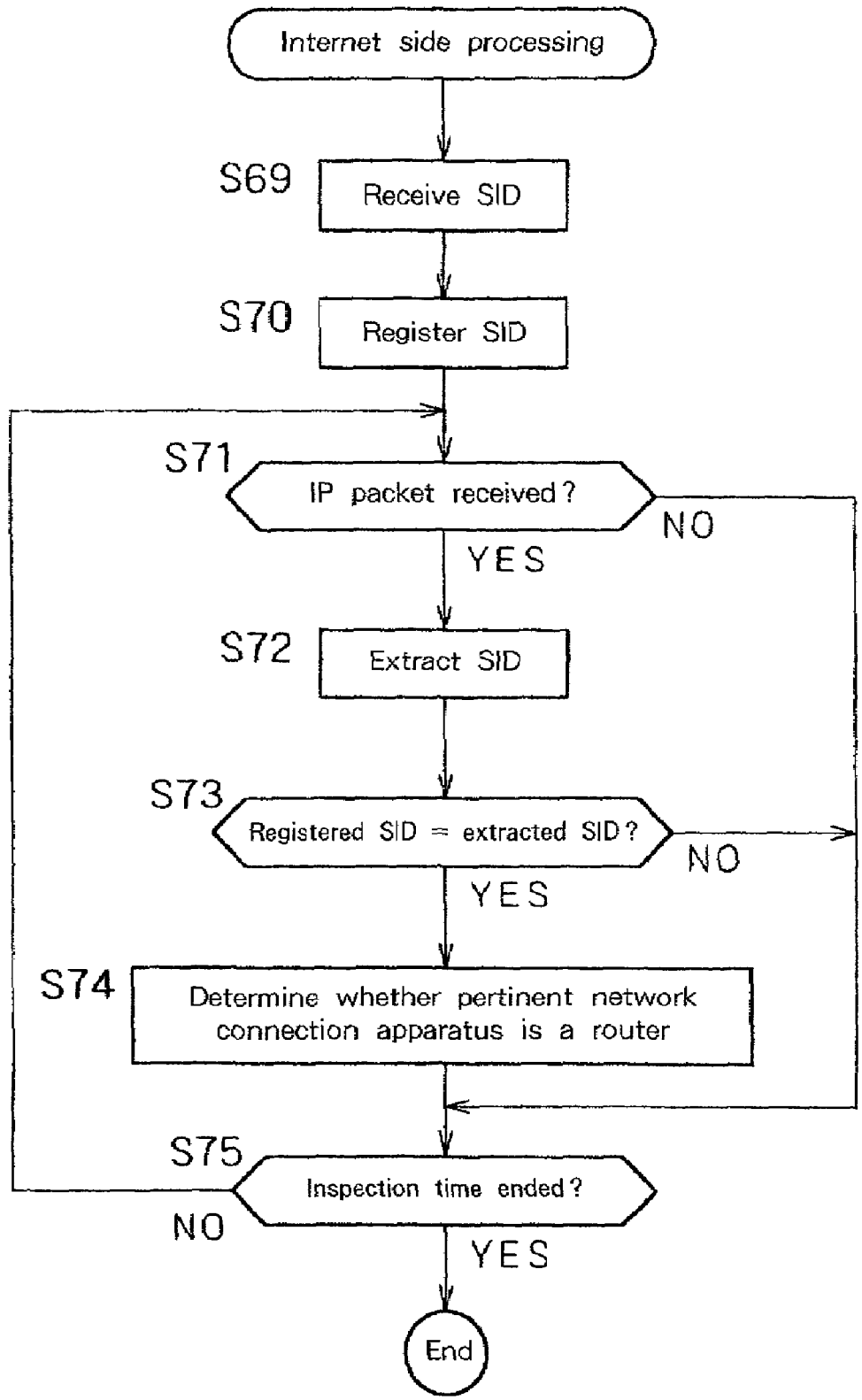
FIG. 8 is a flowchart for a program executed by the recipient router search apparatus for router inspection.

FIG. 8 is a flowchart for a program for the router inspection executed by the recipient router search apparatus 28. The program is applied not only for a search for unauthorized routers 22 on multiple intranets 10, but also for a search for multiple unauthorized routers 22 on each intranet 10. At step S69, the SID, which is transmitted by the transmitter router search apparatus 26 at step S62, is received through the Internet 19 in accordance with the HTTP or the FTP. At step S70, the SID received at step S69 is registered as a current search SID, and when SIDs for multiple intranets 10 are to be transferred to the recipient router search apparatus 28, these SIDs are quickly identified and are registered in correlation with relevant intranets 10. At step S71, a check is performed to determine whether the IP packet addressed to the recipient router search apparatus 28 has been received. When the decision is YES, program control advances to step S72, while when the decision is NO, program control is shifted to step S75. When an IP packet addressed to the recipient router search apparatus 28 is received, at step S72, the SID is extracted from the IP packet. The SID to be extracted is included in the source port number, the destination port number and/or the sequential number portions of the header of the TCP packet that is written in the data portion of the IP packet. At step S73, a check is performed to determine whether, of the SIDs registered at step S70, there is an SID that matches the SID extracted at step S72. When the decision is YES, program control advances to step S74, while when the decision is NO, program control is shifted to step S75. At step S74, it is ascertained that the IP packet received at step S71 is a response IP packet, and that the inspection target network connection apparatus having the source IP address of the response IP packet is serving as a router. At step S75, a check is performed to determine whether a predetermined time has elapsed since the beginning of the inspection. When the decision is YES, this processing is terminated, while when the decision is NO, program control is returned to step S71.

The invention claimed is:

1. A router search system, which examines network connection apparatuses connected to a first network to search for a network connection apparatus that is connected to a second network outside said first network, comprising:
   a transmitter router search apparatus and a recipient router search apparatus that are respectively connected to said first and said second networks,
   wherein said transmitter router search apparatus includes
      generating means, for generating an inspection IP packet including search packet information indicating that a destination IP address and a source IP address are defined as IP addresses for a target network connection apparatus to be inspected and said recipient router search apparatus, and that said inspection IP packet is for a router search, and
      inspection IP packet transmission means, for transmitting said inspection IP packet to said target network connection apparatus to be inspected,
   wherein said recipient router search apparatus includes
      reception means, for receiving an IP packet addressed to the recipient, and
      determination means, for determining whether said IP packet received by said reception means is a response IP packet that constitutes a response to said inspection IP packet transmitted by said target network connection apparatus to be inspected, and for, based on the determination results, determining whether said target network connection apparatus is currently operating as a router.

2. The router search system according to claim 1, wherein said search packet information is written in the packet header on a transport layer on which IP packets are accumulated and that conforms to an OSI Reference Standard Model.

3. The router search system according to claim 1, wherein said transmitter router search apparatus further comprises: acquisition means for permitting, or enabling, said recipient router search apparatus to obtain current search packet information before transmitting an inspection IP packet received from said inspection IP packet transmission means.

4. The router search system according to claim 1, wherein said first network and said second network are an intranet and the Internet.

5. The router search system according to claim 4, wherein said transmitter router search apparatus is arranged for multiple intranets, and said recipient router search apparatus is arranged in common with multiple transmitter router search apparatuses; and wherein said search packet information in said inspection IP packet, which is generated by said generation means of said transmitter router search apparatus for each intranet, can be individually identified for each intranet.

6. The router search system according to claim 2, wherein a transport layer packet is a TCP packet, and said search packet information is written in a source port number, a destination port number and/or a sequential number portion of said TCP packet.

7. The router search system according to claim 2, wherein a transport layer packet is a UDP packet, and said search packet information is written in a source port number and/or a destination port number portion of said UDP packet.

8. A router search method, for examining network connection apparatuses connected to a first network to search for a network connection apparatus that is connected to a second network outside said first network, comprising:
a transmitter router search method and a recipient router search method that are respectively executed on said first and said second networks,
wherein said transmitter router search method includes
a generating step of generating an IP packet including search packet information indicating that a destination IP address and a source IP address are defined as IP addresses for a target network connection apparatus to be inspected and a recipient router, and that said inspection IP packet is for a router search, and
an inspection IP packet transmission step of transmitting said inspection IP packet, and
wherein said recipient router search method includes
a reception step of receiving an IP packet addressed to the recipient, and
a determination step of determining whether said IP packet received at said recipient router is an IP response packet that constitutes a response to said inspection IP packet transmitted by said target network connection apparatus to be inspected, and of, based on the determination results, determining whether said target network connection apparatus is currently operating as a router.

9. The router search method according to claim 8, wherein said search packet information is written in the packet header on a transport layer on which IP packets are accumulated and that conforms to an OSI Reference Standard Model.

10. The router search method according to claim 8, wherein said transmitter router search method further comprises:
an acquisition step of permitting, or enabling, said recipient router search method to obtain current search packet information before transmitting an inspection IP packet received at said inspection IP packet transmission step.

11. The router search method according to claim 8, wherein said first network and said second network are an intranet and the Internet.

12. The router search method according to claim 11, wherein said transmitter router search method is executed for multiple intranets, and said recipient router search method is executed in common with multiple transmitter router search methods; and wherein said search packet information in said inspection IP packet, which is generated at said generation step of said transmitter router search method for each intranet, can be individually identified for each intranet.

13. The router search method according to claim 9, wherein a transport layer packet is a TCP packet, and said search packet information is written in a source port number, a destination port number and/or a sequential number portion of said TCP packet.

14. The router search method according to claim 9, wherein a transport layer packet is a UDP packet, and said search packet information is written in a source port number and/or a destination port number portion of said UDP packet.

* * * * *